(12) United States Patent
Maano (10) Patent No.: US 6,206,451 B1
(45) Date of Patent: Mar. 27, 2001

(54) DUAL PANEL RETRACTING VEHICLE SHADE

(76) Inventor: Arnold Kawika Maano, P.O. Box 11163, Honolulu, HI (US) 96828

( * ) Notice: Subject to any disclaimer, the term of this patent is extended or adjusted under 35 U.S.C. 154(b) by 0 days.

(21) Appl. No.: 09/520,102

(22) Filed: Mar. 7, 2000

(51) Int. Cl.[7] ....................................................... B60J 1/20
(52) U.S. Cl. ......................... 296/136; 296/95.1; 296/99.1
(58) Field of Search ................................. 296/95.1, 99.1, 296/136

(56) References Cited

U.S. PATENT DOCUMENTS

| | | | |
|---|---|---|---|
| 3,876,245 | * | 4/1975 | Lowery ................................... 296/95 |
| 4,848,827 | * | 7/1989 | Ou ........................................ 296/99.1 |
| 4,950,020 | * | 8/1990 | Chen .................................... 296/95.1 |
| 5,230,545 | * | 7/1993 | Huang et al. ........................ 396/95.1 |
| 5,762,393 | * | 6/1998 | Darmas, Sr. ............................ 296/98 |
| 6,012,759 | * | 1/2000 | Adamek ............................... 296/136 |

* cited by examiner

Primary Examiner—D. Glenn Dayoan
Assistant Examiner—Greg Blankenship
(74) Attorney, Agent, or Firm—John D. Gugliotta (57) ABSTRACT

A retractable automobile shade device having a pair of sun shade panels for covering the front and rear of the vehicle which retract within a rectangular housing. The housing is mounted on the roof of the vehicle via special clamps which attach to the luggage rack or the rain gutters. Each shade panel has a pull handle located on the end for manual deployment. An optional privacy screen that surrounds and encloses the vehicle adds further protection.

8 Claims, 6 Drawing Sheets

DUAL PANEL RETRACTING VEHICLE SHADE

RELATED APPLICATIONS

There are no previously filed, nor currently any co-pending applications, anywhere in the world.

BACKGROUND OF THE INVENTION

1. Field of the Invention

The present invention relates generally to vehicle shades and, more particularly, to a dual panel retracting vehicle shade.

2. Description of the Related Art

The love affair people have with their automobiles is a well-known fact. Countless hours are spent cleaning, waxing, and detailing cars all around the world ever day, just so they can look their best as they drive down the road. While physical maintenance such as that outlined above is an important part of keeping a car looking good, protecting a car from environmental dangers is perhaps even more important. Long hours spent under a blazing sun will fade exterior paint and interiors. Dust, dirt, acid rain and other chemical fallout will etch and damage not only painted finishes, but glass, plastic and rubber as well. Car covers that are tied around the entire car protect it from this danger but they are clumsy and time consuming to deploy every time the car is parked.

In the related art, there exists many patents for retractable car cover and shades. None of them provide for a dual solid panel design extending from a housing over the front and rear of the vehicle. The present invention is an improvement over these patents in that it is attached to the roof of the vehicle's luggage rack or rain edges via special clamps and deploys simply pulling the panels from a housing.

A search of the prior art did not disclose any patents that read directly on the claims of the instant invention; however, the following references were considered related:

| U.S. Pat. No. | Inventor | Issue Date |
| --- | --- | --- |
| 5,575,524 | Crunk | Nov. 19, 1996 |
| 5,039,153 | Bonner | Aug. 13, 1991 |
| 4,363,513 | Sahar | Dec. 14, 1982 |
| 5,344,206 | Middleton | Sep. 6, 1994 |
| 4,921,299 | Herrick | May 1, 1990 |
| 5,782,284 | Leatherman | Jul. 21, 1998 |
| 4,998,768 | Wu | Mar. 12, 1991 |
| 4,068,885 | Berger | Jan. 17, 1978 |
| 5,588,476 | Tretheway | Dec. 31, 1996 |
| 1,771,322 | Tassell | July 22, 1930 |

Accordingly, there is a need for a system and method by which vehicles can be protected from damaging forces such as sunlight while parked outside in a manner that is quick, easy and effective. The development of present invention fulfills this need.

SUMMARY OF THE INVENTION

It is therefore an object of the present invention to provide a sun shade that attaches to the roof of vehicle in a manner similar to a luggage rack.

It is another object of the present invention to provide a sun shade that is easily deployed.

It is yet another object of the present invention to block 100% of light.

It is yet still another object of the present invention to provide a car shade that can be deployed both front and back It is an advantage of the present invention that it is more effective than conventional car covers.

It is another advantage of the present invention that it is made with shade material with lightweight plastic or mylar.

It is a benefit of the present invention that it protects car against physical damage.

It is another benefit of the present invention that it protects car against environmental damage.

Briefly described according to one embodiment of the present invention, the Dual Panel Retracting Vehicle Shade as its name suggests, is an apparatus that is intended to shade and protect a motor vehicle from the harmful effects of the sun's rays as well as environmental hazards such as dirt, dust, chemicals, bird droppings and the like. A housing assembly is mounted on the luggage rack on the roof. When the car is parked at an exterior location, front and rear shade panels are pulled out from within the housing assembly toward the front and rear of the vehicle, respectively. Such shade panels accomplish several feats. First it keeps the passenger compartment cool on sunny day by offering shade to not only the windshield but all windows as well. It keeps environmental hazards like acid rain, soot, dust and the like from damaging the vehicle. And finally, it keeps physical dangers such as hail, stones, and the like from damaging the vehicle. While traveling, the front and rear panels retract into the roof mounted carrier, where they are stored. The use of the Dual Panel Retracting Vehicle Shade allows car owners to protect their investment from physical damage without the clumsiness and inefficiency of conventional car covers.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

| | | | |
|---|---|---|---|
| 5 | Vehicle | 18 | Latch |
| 10 | Dual Panel Retracting Vehicle Shade | 19 | Front Panel |
| | | 19a | Pole |
| 15 | Housing Assembly | 19b | Panel |
| 15a | Top Sidewall | 19c | Handle |
| 15b | Right Sidewall | 19d | Latch |
| 15c | Bottom Sidewall | 20 | Front Housing Door |
| 15d | Left Sidewall | 25 | Privacy Screen |
| 15e | Track Housing Member | 25a | Driver Side Privacy Screen Panel |
| 15f | Panel Track | | |
| 15g | Roof Clamp Slot | 25b | Front Privacy Screen Panel |
| 16 | Roof Clamps | 25c | Driver Side Privacy Screen Panel |
| 17 | Rear Housing Door | | |
| 18 | Rear Panel | 25d | Rear Privacy Screen Panel |
| 18a | Pole | 26 | Screen Attachment Means |
| 18b | Panel | 27 | Adjacent Screen Attachment Means |
| 18c | Handle | | |

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
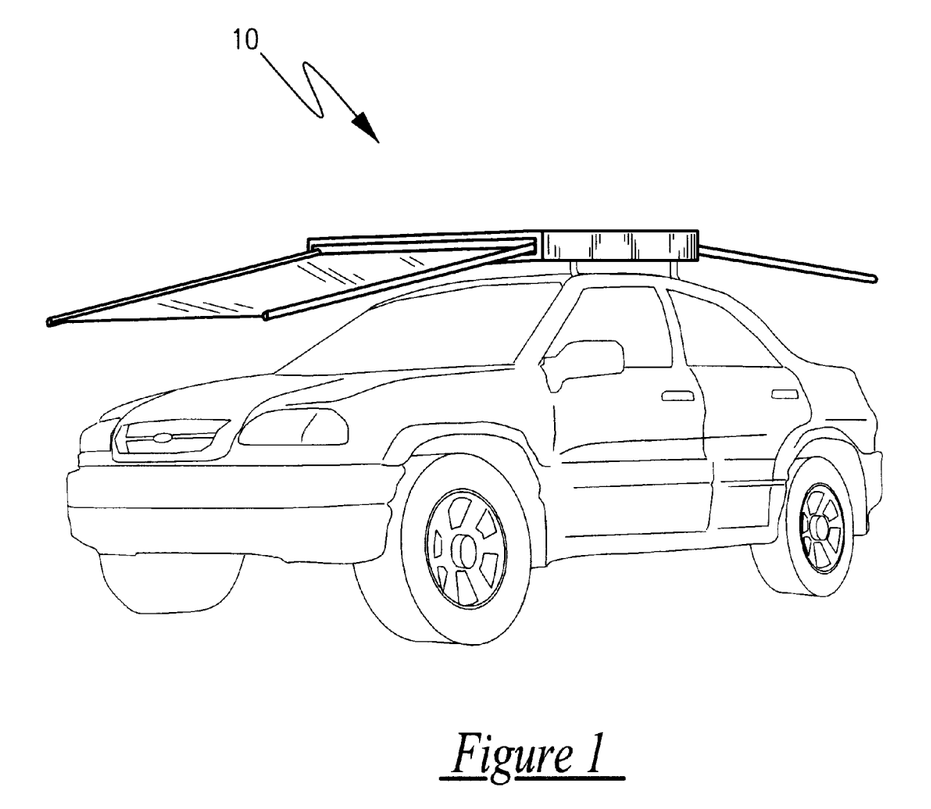
FIG. 1 is a perspective view of a Dual Panel Retracting Vehicle Shade installed on the rooftop of a vehicle with both the front and rear shade panel deployed, according to the preferred embodiment of the present invention.

Referring now to FIG. 1, a Dual Panel Retracting Vehicle Shade 10 is shown, according to the present invention, for installation on the rooftop of a vehicle such as an automobile. The device is mounted centrally between the front and rear windows and transversely from the left edge of the roof to the right edge. Typically, the device 10 would be mounted on the vehicle luggage rack, if so equipped, with special clamps that are provided. Alternately, the device 10 could be mounted on the vehicle roof with special clamps that attach to the vehicle's rain gutters. A front and rear shade panel retractably extend from within a central housing assembly and angled slightly downward for drainage to shade the front and rear of a vehicle as shown.

Figure 2:
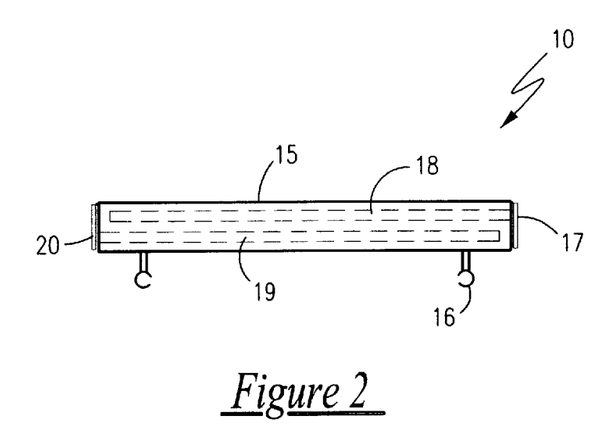
FIG. 2 is a left side view of a Dual Panel Retracting Vehicle Shade in the retracted configuration, according to the preferred embodiment of the present invention.

Referring to FIG. 2, shown is a left side view of a Dual Panel Retracting Vehicle Shade, wherein front shade panel 18 and rear shade panel 19 are in the retracted configuration within housing assembly 15. Special roof clamps 16 are attached to housing assembly 15 to attach housing assembly 15 to the vehicle luggage rack or, alternately, the vehicle's rain gutters. A front housing door 20 and rear housing door 17 are hingably attached on the front and rear of housing assembly 15, respectively, to enclose front shade panel 18 and rear shade panel 19 within housing assembly 15 when in the retracted configuration.

Figure 3:
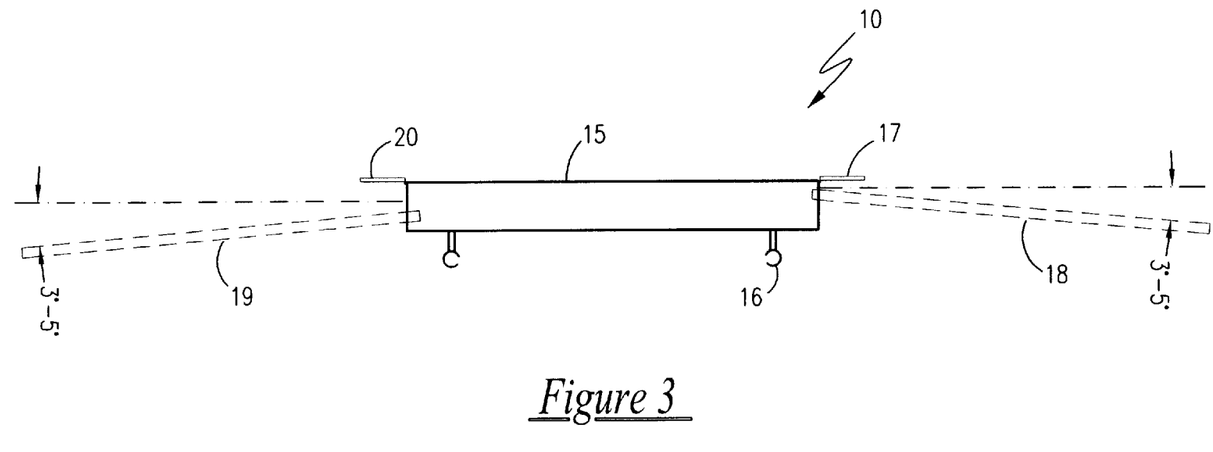
FIG. 3 is a left side view of a Dual Panel Retracting Vehicle Shade in the extended configuration, according to the preferred embodiment of the present invention.

Referring now to FIG. 3, front shade panel 19 is shown extending forwardly from within housing assembly 15. In the extended configuration, front shade panel 19 is angled downward approximately 3° to 5° from the horizontal plane for water and rain drainage. Front housing door 20 pivots upwardly out of the way when front shade panel 19 is extended forward. Rear shade panel 18 is shown extending rearwardly from within housing assembly 15. In the extended configuration, rear shade panel 18 is angled downward approximately 3° to 5° from the horizontal plane for water and rain drainage. Rear housing door 17 pivots upwardly out of the way when rear shade panel 18 is extended rearwardly.

Figure 4:
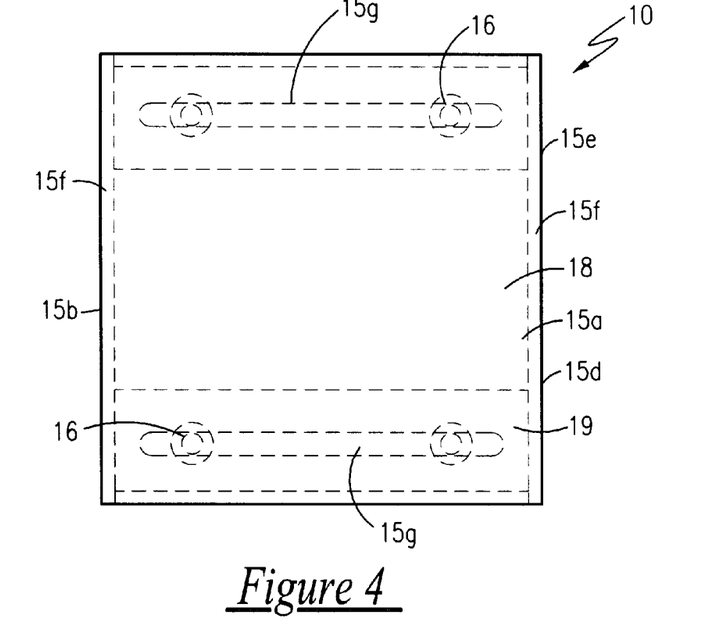
FIG. 4 is a top view of a Dual Panel Retracting Vehicle Shade, according to the preferred embodiment of the present invention.

FIG. 4 shows a top view of a Dual Panel Retracting Vehicle Shade and more detail of how front shade panel 19 and rear shade panel 18 fit within housing assembly 15 when retracted. As shown in FIGS. 2 and 3, front shade panel 19 is located physically beneath rear shade panel 18 within housing assembly 15. Housing assembly 15 is composed of a bottom sidewall 15c, top sidewall 15a, left sidewall 15d, and right sidewall 15b attached together form a rectangular housing having two rectangular apertures on the ends and an interior volume. A pair of track housing members 15e are located within the interior volume of housing assembly 15 adjacent to the interior of the left sidewall 15d and right sidewall 15b. Front shade panel 19 and rear shade panel 18 are mounted within housing 15a on a pair of panel tracks 15f formed in each of track housing members 15e. Panel tracks 15f are formed so that a slight inclination exists from the front end of the panel track to the rear end of the panel track. For the upper panel track 15f for slidably housing rear shade panel 18, the front end of panel track 15f is slightly higher than the rear end of panel track 15f so that a gradient of approximately 3° to 5° exists along it elongated longitudinal axis to give rear shade panel 18 the downwardly angled configuration as described. Inoppositely, the lower panel track 15f for front shade panel 19 is higher lower at the front end than at the rear end and has a gradient of approximately 3° to 5° along its elongated longitudinal axis to give front shade panel 19 the downwardly angled configuration as described. Housing 15 may be formed from thin sheets of any suitable material such as plastic or metal that is light, heat, chemical, impact, and weather resistant.

Figure 5:
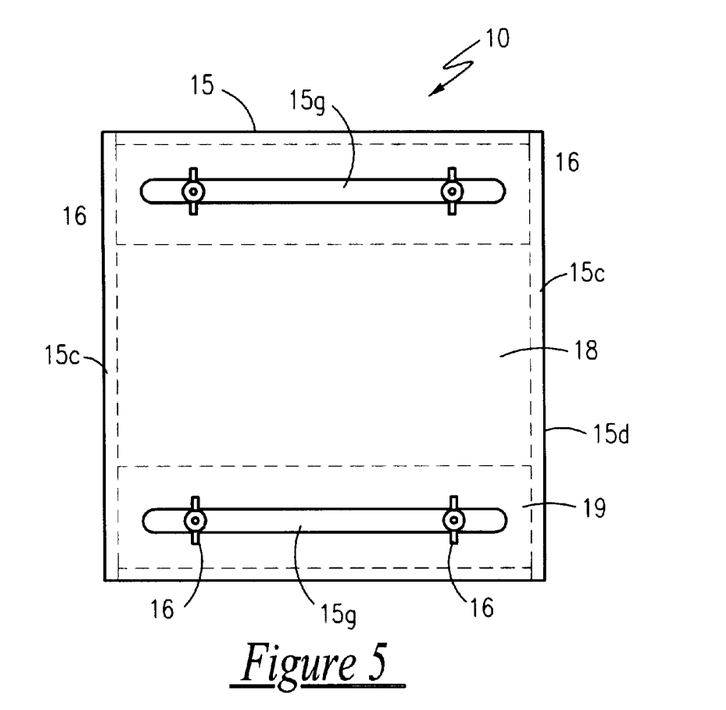
FIG. 5 is a bottom view of a Dual Panel Retracting Vehicle Shade, according to the preferred embodiment of the present invention.

FIG. 5 shows a bottom view of a Dual Panel Retracting Vehicle Shade 10, showing the detail of a plurality of roof clamps 16 slidably fitted within a pair of roof clamp slots formed in the bottom sidewall of 15c of housing 15. Many such roof clamps exist on the market and could be readily adapted for the purpose described. In this fashion, individual roof clamps 16 can be transversely moved according to the width of the particular vehicle. Additional clamps 16 may be added for added support if the design of the vehicle luggage rack permits. Alternately, roof rain gutter clamps may be utilized by also slidably securing then in roof clamp slot 15g. It is also envisioned that other suitable means to attach housing 15 to roof of vehicle could be used.

Figure 6:
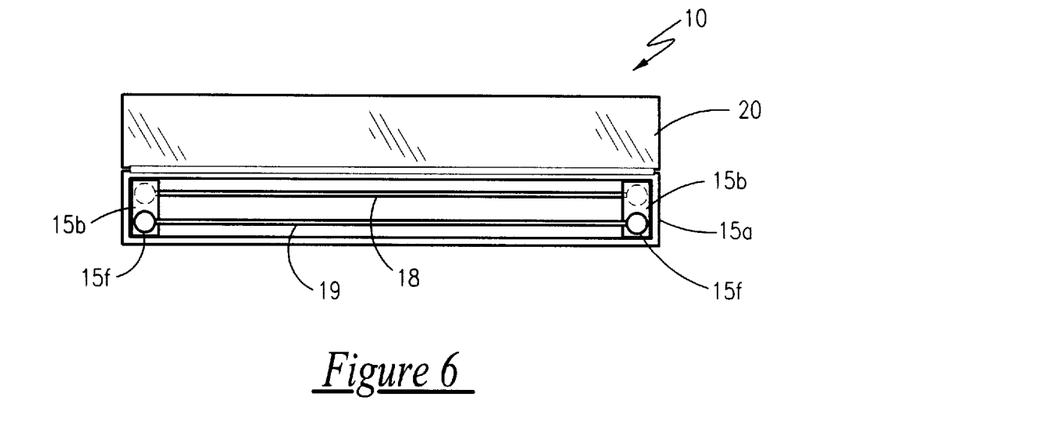
FIG. 6 is a front view of a Dual Panel Retracting Vehicle Shade with the front housing cover in the open position, according to the preferred embodiment of the present invention.

Referring now to FIG. 6 shown is a front view of housing 15 with front housing door 20 in the open position. One end of both front shade panel 19 and rear shade panel 18 can be seen wherein rear shade panel 18 is installed above front shade panel 19. Both front shade panel 19 and rear shade panel 18 are slidably installed in the interior volume of housing 15. Essentially, front shade panel 19 and rear shade panel 18 are constructed by suspending a sheet of material such as plastic or fiberboard between two poles of sufficient stiffness. For purposes of disclosure, only the construction of front shade panel 19 is described in FIG. 8 with rear shade panel 18 identical in all respects except for its length which is adapted for the particular vehicle make and model.

Figure 7:
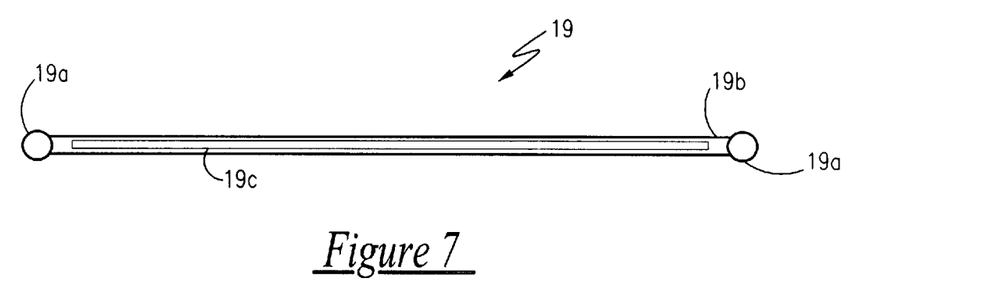
FIG. 7 is a front view of the front shade from a Dual Panel Retracting Vehicle Shade, according to the preferred embodiment of the present invention.
Figure 8:
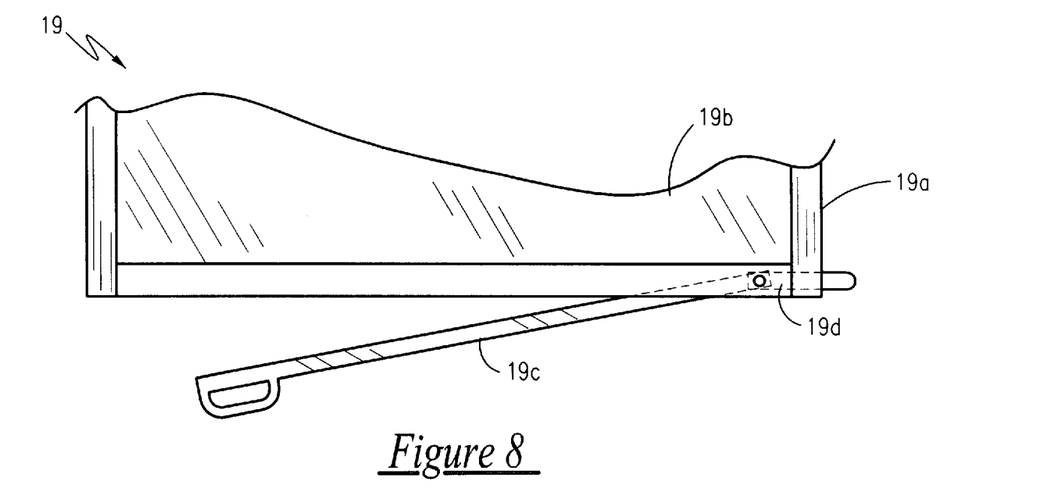
FIG. 8 is a partial cutaway view of the front shade from a Dual Panel Retracting Vehicle Shade, according to the preferred embodiment of the present invention.

Getting back to front shade panel 19, a panel 19b is suspended between two poles 19a. As shown in FIGS. 7 and 8, a handle 19c is provided on the front edge of front shade panel 19 to aid in extending it from the housing 15 and releasing a latch 19d which locks it into place in the retracted position. Front shade panel 19 is slidably mounted in housing 15 by inserting the rearward ends of poles 19a into panel tracks 15f located formed in track housing 15e located on opposite sides of housing assembly 15. Front shade panel 19 is inserted into housing 15 until latch 19d engages a specially formed receiving point in the sidewall of panel track 15f (not shown). When front shade panel 19 is in the fully extended position, a similar mechanism such as a stop can be employed to prevent front shade panel 19 from being completely removed from housing 15. Rear shade panel 18 is inserted into housing 15 identically except that it is inserted into a pair of panel tracks located physically above the panel tracks 15f in which front shade panel 19 was inserted into.

Figure 9:
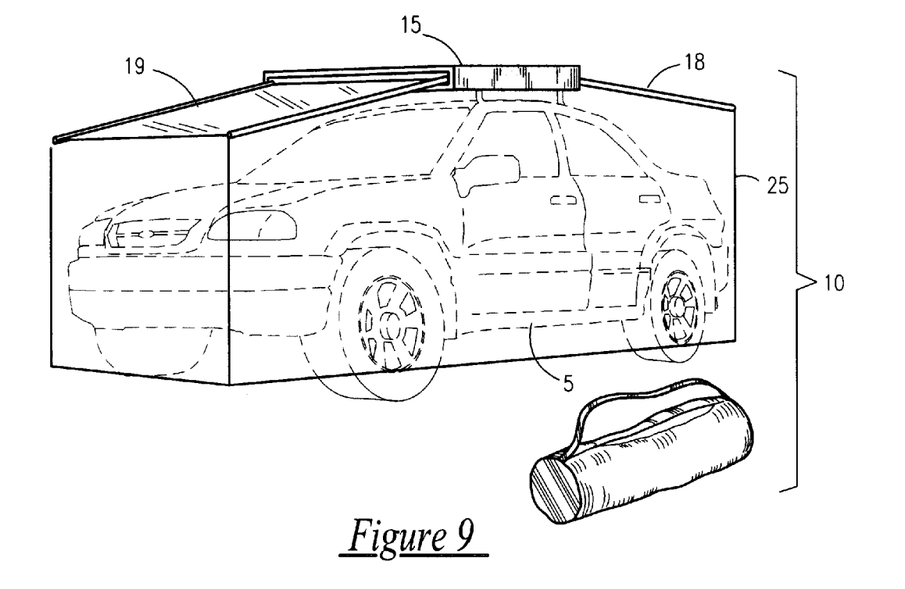
FIG. 9 is a perspective view of a Dual Panel Retracting Vehicle Shade installed on the rooftop of a vehicle with both the front and rear shade panel deployed and a privacy screen installed around the periphery of the shade housing, according to the alternate preferred embodiment of the present invention.

In an alternate preferred embodiment, and referring now to FIG. 9, a specially formed privacy screen 25 is attached around the periphery of front shade panel 9, rear shade panel 9, and housing 15. Screen 15 provides privacy to the occupants of vehicle 5 as well as protects the sides of vehicle 5 from the elements such as rain, chemical exposure, dust and light. Privacy screen 25 extends vertically from the periphery of front shade panel 9, rear shade panel 19, and housing 15 to slightly above the ground to provide maximum protection. Privacy screen 25 extends the entire width of housing 5 and vehicle 5. Privacy screen 25 is made from 4 sheets of water resistant material such as vinyl, plastic, or fabric which are attached along adjacent edges as described further hereinbelow.

Figure 10:
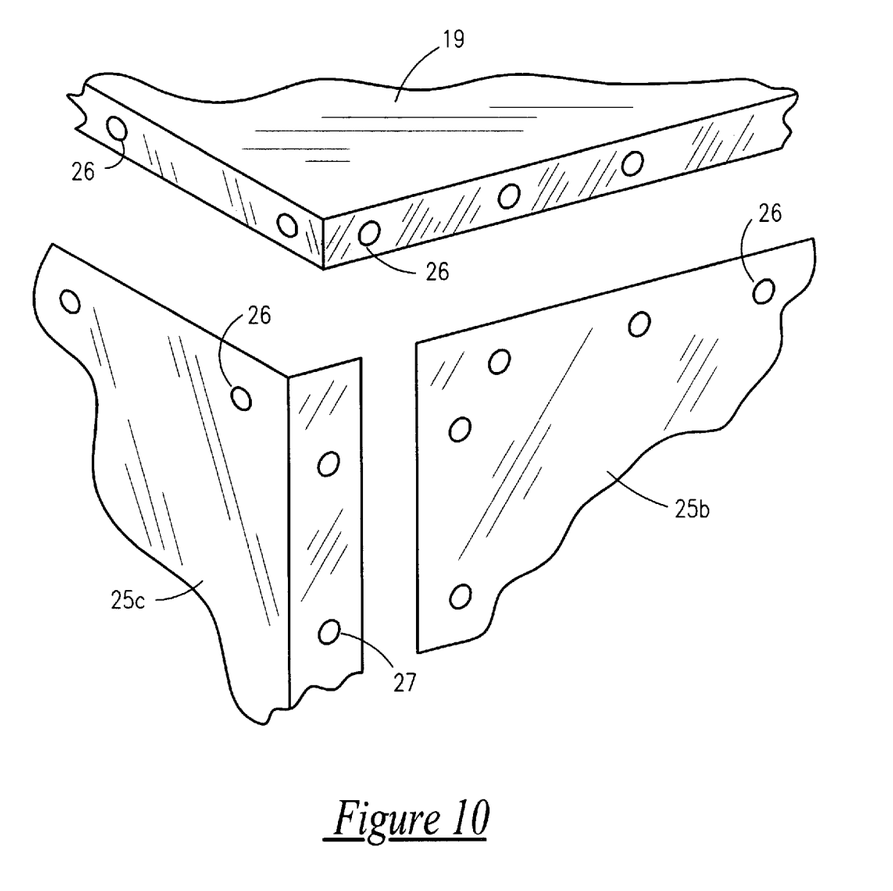
FIG. 10 is a partial cutaway perspective view of the front and driver side sections of the privacy screen for a Dual Panel Retracting Vehicle Shade showing the detail of the attachment means to the outer edge of the front shade panel, according to the alternate preferred embodiment of the present invention.

Finally, referring to FIG. 10, a partial cutaway view of a corner of front panel 19 and privacy screen 25 is shown. Privacy screen 25 is actually an assembly of four sections 25a, 25b, 25c and 25c which fasten together along adjacent edges to form an enclosure that surrounds vehicle 6. Driver side privacy screen panel 25b, front privacy screen panel 25c, passenger side privacy screen panel 25d, (not shown) and rear privacy screen panel 25a (not shown) are attached together along adjacent edges by adjacent screen attachment means 27 which can consist of snaps, hook and loop fasteners, or other fastening devices. Driver side privacy screen panel 25b, front privacy screen panel 25c, passenger side privacy screen panel 25d, (not shown) and rear privacy screen panel 25a (not shown) are then attached to the outer edges of front panel 19, rear panel 18, and housing 15 by screen attachment means 26 can consist of snaps, hook and loop fasteners, or other fastening devices. Privacy screen 26 can be installed around a vehicle and removed as desired and stored in an optional bag made from the same material for stowage in the trunk of vehicle 5.

2. Operation of the Preferred Embodiment

To use the present invention, one simply attaches it to the roof of the vehicle with special clamps which attach to the luggage rack or the rain gutters. To extend the shade panels, one simply opens a small door covering the front or rear of the invention to expose the retracting/extending panels. A handle on the front edge of the front and rear panel allows one to grip the panel and pull it out of the housing. The handle also releases a latch mechanism used to secure the shade panels within the housing. The panels are pulled from within the housing until fully extended and the vehicle is covered. To retract the shade panels, one just simply pushes the panels back into the housing until it is fully inside. At this point, the door covering the housing opening will close, due to gravity and seal the housing. An optional privacy screen can be quickly deployed around the vehicle to provide additional protection. The privacy screen is attached utilizing conventional fasteners such as snaps to snap the screen to the shade panels and the housing. The privacy screen is folded when not in use and stored in a bag made from material similar to the privacy screen.

The foregoing description is included to illustrate the operation of the preferred embodiment and is not meant to limit the scope of the invention. The scope of the invention is to be limited only by the following claims.

What is claimed is:

1. A dual panel retracting vehicle shade for installation on a rooftop of a vehicle, comprised of:
    a housing mounted centrally on the rooftop of the vehicle between front and rear windows and transversely from a left edge of the vehicle rooftop to a right edge, wherein said housing is composed of a bottom sidewall, a top sidewall, a left sidewall, a right sidewall attached together forming a rectangular housing having two rectangular apertures on ends of the rectangular housing and an interior volume, and wherein a pair of track housing members are located within the interior volume of said housing adjacent to an interior of the left sidewall and right sidewall of said housing;
    a front shade panel, wherein said front shade panel and a rear shade panel are mounted within said housing on a pair of panel tracks formed in each of said track housing members with said front shade panel located physically beneath said rear shade panel within said housing and said panel tracks having a gradient of approximately 3° to 5° so that said front panel and said rear panel are angled downwardly approximately 3° to 5°;
    said rear shade panel and said front shade panel retractably extend from said housing; and
    an attachment means for attaching said housing to the rooftop of the vehicle, wherein said attachment means comprises clamps for mounting said vehicle shade on a luggage rack, or onto rooftop rain gutters, wherein said front shade panel and said rear shade panel retractably extend from within said housing to shade a front and rear of the vehicle and angled downwardly for rain and water drainage, and a front housing door pivots upwardly when said front shade panel is extended forward and a rear housing door pivots upwardly when said rear shade panel is extended rearwardly, and said front housing door and said rear housing door enclose said front shade panel and said rear shade panel within said housing when said front shade panel and said rear shade panel are in a retracted configuration.

2. The dual panel retracting vehicle shade of claim 1, wherein said front shade panel is comprised of:
    a sheet of material comprising one of plastic and fiberboard suspended between two poles of sufficient stiffness;
    a handle, said handle provided on a front edge of said front shade panel to aid in extending said front shade panel from said housing; and
    shade configuration.

3. The dual panel retracting vehicle shade of claim 2, wherein said front shade panel is slidably mounted in said housing by inserting rearward ends of said poles into said panel tracks.

4. The dual panel retracting vehicle shade of claim 3, wherein said rear shade panel is identical to said front shade panel in all respects except for in length, and wherein said rear shade panel is inserted into said housing identically to said front panel except that said rear panel is inserted into a pair of panel tracks located physically above the panel tracks in which said front shade panel was inserted.

5. The dual panel retracting vehicle shade of claim 4, wherein said housing is formed from thin sheets of any suitable material comprising plastic or metal that is light, heat, chemical, impact, and weather resistant.

6. The dual panel retracting vehicle shade of claim 5, wherein said attachment means is further comprised of a plurality of roof clamps slidably fitted within a pair of roof clamp slots formed in the bottom sidewall of said housing, said roof clamps capable of being transversely moved according to a width of the vehicle for attachment to the luggage carrier or rain gutters on the rooftop of the vehicle.

7. The dual panel retracting vehicle shade of claim 6, further comprised of:

a privacy screen, said privacy screen consisting of a driver side privacy screen panel, a front privacy screen panel, a passenger side privacy screen panel, and a rear privacy screen panel attached together along adjacent edges by an adjacent screen attachment means; and a privacy screen attachment means, said privacy screen attachment means for attaching said driver side privacy screen panel, said front privacy screen panel, said passenger side privacy screen panel, and said rear privacy screen panel to outer edges of said front panel, said rear panel, and said housing;

wherein said privacy screen can be installed around the vehicle and removed as desired and stored in an optional bag for storage in a trunk of said vehicle.

8. The dual panel retracting vehicle shade of claim 7, wherein said adjacent screen attachment means and said privacy screen attachment means comprises one of snaps and hook and loop fasteners.

\* \* \* \* \*